(12) United States Patent
Scaini et al.

(10) Patent No.: US 8,106,327 B2
(45) Date of Patent: Jan. 31, 2012

(54) ARC WELDING TORCH INCLUDING A WIRE GUIDE OPEN ON ONE SIDE AND ARRANGED TO RECEIVE A WELDING WIRE FROM A LATERALLY SPACED APART LOCATION AND METHOD OF USING SAME

(75) Inventors: Cristian Scaini, Azzano San Paolo (IT); Christian Cocca, Cinisello Balsamo (IT); Andrea Provesi, Secugnago (IT)

(73) Assignee: Saipem S.p.A., Milan (IT)

( * ) Notice: Subject to any disclaimer, the term of this patent is extended or adjusted under 35 U.S.C. 154(b) by 704 days.

(21) Appl. No.: 11/574,138

(22) PCT Filed: Aug. 22, 2005

(86) PCT No.: PCT/EP2005/009037
§ 371 (c)(1),
(2), (4) Date: Apr. 17, 2009

(87) PCT Pub. No.: WO2006/021396
PCT Pub. Date: Mar. 2, 2006

(65) Prior Publication Data
US 2009/0206060 A1    Aug. 20, 2009

(30) Foreign Application Priority Data

Aug. 24, 2004 (GB) .................................. 0418899.1

(51) Int. Cl.
*B23K 9/16* (2006.01)
(52) U.S. Cl. .................. 219/74; 219/137.44; 219/137.61
(58) Field of Classification Search .................... 219/70, 219/137.44, 137.61, 138
See application file for complete search history.

(56) References Cited

U.S. PATENT DOCUMENTS 2,179,108 A    11/1939    Westberg
(Continued)

FOREIGN PATENT DOCUMENTS

CA    2 242 273 A1    2/2000
(Continued)

OTHER PUBLICATIONS

Communication from European Patent Office dated Sep. 5, 2009, in EP 05774906.1.

*Primary Examiner* — Mark Paschall
(74) *Attorney, Agent, or Firm* — Buchanan Ingersoll & Rooney PC

(57) ABSTRACT

The present invention relates to a welding torch that includes an electrode (3) that has a longitudinal groove (9) formed therein which guides a welding wire (4) which is fed form a laterally spaced-apart location. The electrode (3) is open and the wire (4) is supported on one side only. In the region of the welding tip, the electrode (3) is elongate and the cross-sectional area is smaller than the area at a position further from the tip. Regions between an outer housing (11) and a main support body (2) define two shielding gas conduits positioned on opposite sides of the body (2), through which gas flows and then combines to form a unitary stream. The body (2) contains cooled regions which are supplied with cooling fluid by a conduit (7) and removed by conduit (8), parts of which are positioned between the shielding gas conduits close to the welding electrode (3).

18 Claims, 4 Drawing Sheets

U.S. PATENT DOCUMENTS

| | | | |
|---|---|---|---|
| 3,112,393 A | * 11/1963 | Manz et al. | 219/137.44 |
| 3,832,520 A | 8/1974 | Glasser | |
| 3,940,586 A | 2/1976 | Stearns et al. | |
| 3,992,603 A | 11/1976 | Reynolds | |
| 4,105,891 A | 8/1978 | Hill et al. | |
| 4,179,059 A | 12/1979 | Chang et al. | |
| 4,295,031 A | * 10/1981 | Roen | 219/125.12 |
| 4,296,308 A | 10/1981 | Nakahama et al. | |
| 4,333,001 A | 6/1982 | Nakahama et al. | |
| 4,436,977 A | 3/1984 | Cash et al. | |
| 4,504,729 A | 3/1985 | Asano | |
| 4,549,068 A | 10/1985 | Kensrue | |
| 4,567,343 A | 1/1986 | Sullivan et al. | |
| 4,733,052 A | 3/1988 | Nilsson et al. | |
| 4,988,846 A | 1/1991 | Karlsten et al. | |
| 5,257,732 A | 11/1993 | Leturno | |
| 5,278,392 A | 1/1994 | Takacs | |
| 5,347,098 A | 9/1994 | Murakami et al. | |
| 5,635,091 A | 6/1997 | Hori et al. | |
| 5,669,556 A | 9/1997 | Yoshida | |
| 5,714,729 A | 2/1998 | Yamada et al. | |
| 5,728,995 A | 3/1998 | Kensrue | |
| 5,844,201 A | 12/1998 | Dibacco et al. | |

FOREIGN PATENT DOCUMENTS

| | | |
|---|---|---|
| EP | 0 523 615 A2 | 1/1993 |
| EP | 0 621 102 A1 | 10/1994 |
| EP | 0 664 81 A | 7/1995 |
| EP | 1 108 491 A2 | 6/2001 |
| GB | 4981 | 9/1902 |
| GB | 680693 | 10/1952 |
| GB | 1476321 | 6/1977 |
| GB | 1 515 165 | 6/1978 |
| JP | 50-067758 | 6/1975 |
| JP | 59-148670 | 8/1984 |
| JP | 63-207478 A | 8/1988 |
| JP | 02-280972 A | 11/1990 |
| JP | 3-081071 A | 4/1991 |
| JP | 6-285644 A | 10/1994 |
| JP | 7-100653 A | 4/1995 |
| JP | 2000-094137 A | 4/2000 |
| WO | WO 00/61327 A1 | 10/2000 |

\* cited by examiner

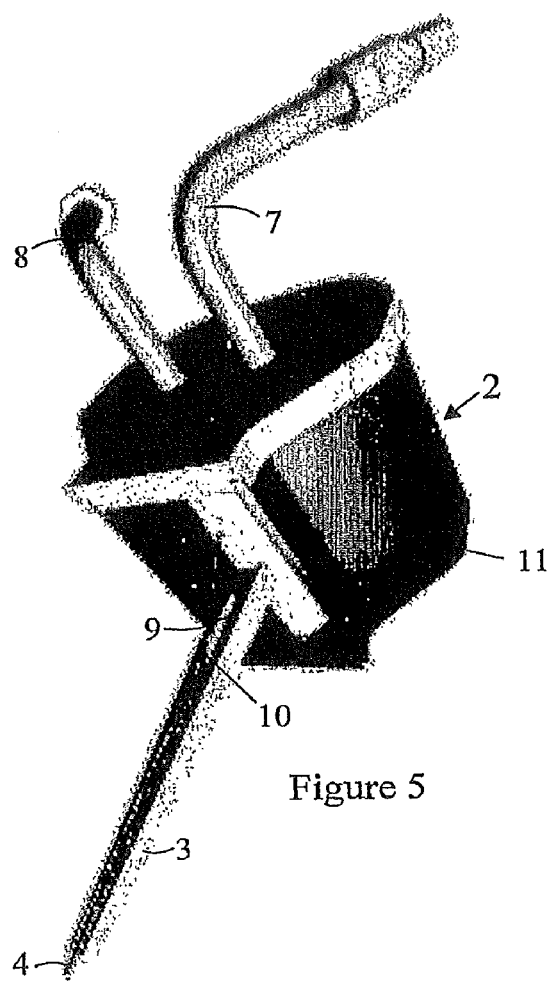
Figure 5
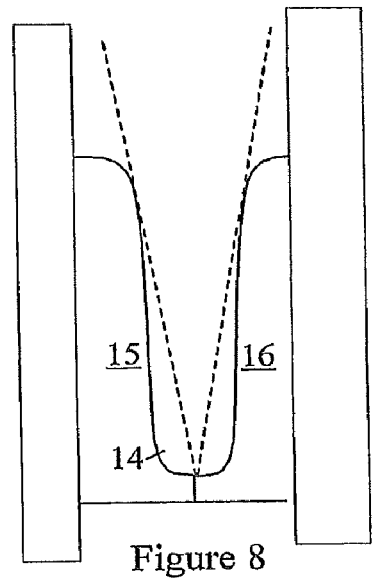
Figure 8
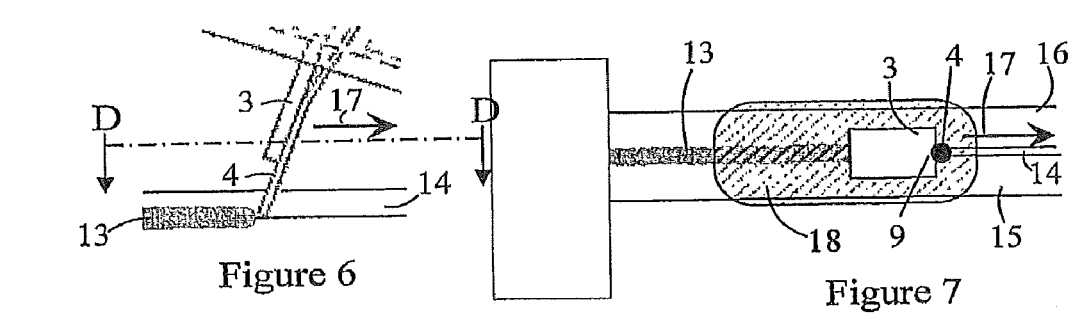
Figure 6
Figure 7

ARC WELDING TORCH INCLUDING A WIRE GUIDE OPEN ON ONE SIDE AND ARRANGED TO RECEIVE A WELDING WIRE FROM A LATERALLY SPACED APART LOCATION AND METHOD OF USING SAME

The present invention relates to a welding torch and to a method of welding.

Welding torches of the prior art suffer from various problems.

WO 00/61327 seeks to overcome problems associated with a prior art welding torch disclosed in WO 00/61327 that suffers from various problems. The prior art welding torch that WO 00/61327 seeks to improve includes a cylindrical passageway through which a welding wire is passed, the wire exiting the passageway at an exit orifice at the welding tip of the torch. Such passageways are prone to blockage, particularly near the exit orifice, for example due to imperfections in the cross-sectional shape of the wire. Free travel of the welding wire down the passageway may often be difficult to maintain. The contact tip of the welding torch is expensive and difficult to manufacture. The welding current may be concentrated at the tip of the welding torch, for example, due to the geometry of the welding torch. Also, poor conductive contact may exist between the wire and the passageway upstream of the tip. Such factors contribute to wear of the welding tip and consequently welding tips may need to be replaced frequently, possibly so often that the tip lasts long enough only to weld a few joints where the total length of the welding runs required to join each pair of work-pieces is relatively long. When welding together pipes to form a gas or oil pipeline, several welding torches may be used simultaneously for each pipe weld and many thousand of pipe welds may be required when laying a length of pipeline. If each welding tip is able only to weld three or four pipe joints then the cost of providing welding tips when laying pipelines can therefore be significant.

U.S. Pat. No. 4,988,846 seeks to alleviate the problem of blockage of passages due to contaminating material being brought into a "contact tip" (a nozzle) of a welding torch by an electrode or filler passing through a cylindrical passageway of the nozzle. A deep slot-like groove is provided that extends radially from the cylindrical bore so that contaminating material may fall out radially from the contact tip. However, this arrangement would appear still to be susceptible to problems associated with blockages due to build up of contaminants in the passageway. Furthermore, U.S. Pat. No. 4,988,846 would also appear not to alleviate the problem of sticking due to imperfections in the cross-sectional shape of the wire.

It would be desirable to improve the ability of a welding torch to weld within deep and/or narrow grooves formed between work-pieces to be welded together. However several problems may arise when seeking to weld within such deep and/or narrow grooves. Shielding gas, which may be necessary to facilitate good quality welds, may not be able to be provided reliably all the way to the bottom of the throat of the groove. The geometry of the welding torch may otherwise be unsuitable, for example, parts of the welding torch might obstruct the welding tip of the torch from extending sufficiently deeply into the groove. Also, when welding together relatively thick work-pieces as fast as possible, it is often necessary to perform many welding passes in quick succession, which in combination generate high temperatures. If newly formed welds do not cool sufficiently quickly in an atmosphere of shielding gas, the quality of the final weld-joint may be detrimentally affected. Any oxygen that is present in the groove, for example oxygen not properly displaced by the provision of shielding gas, may cause undesirable oxidation of the weld.

GB 1476321 discloses a welding torch for welding in a narrow groove, wherein a telescopic gas shroud is provided to restrict the flow of shielding gas away from the welding region and to maintain an inert atmosphere for the welding. The telescopic gas shroud is contracted and extended in dependence on the position of the tip of the welding torch relative to the groove. Such a construction is complicated, bulky and difficult to operate reliably. Also since the levels of oxygen in the groove depend partly on the distance between the free end of the gas shroud and work-piece, it may be difficult to maintain a sufficiently low concentration of oxygen in the welding region.

U.S. Pat. No. 4,567,343 discloses a welding torch including a dual shield gas flow system. The torch includes a wire conduit including a cylindrical bore for supplying welding wire to a welding region. The shielding gas system includes primary and secondary shield gas streams, the secondary stream in use surrounding the primary gas flow in the direction of the weld.

U.S. Pat. No. 5,844,201 describes a welding torch including a shielding gas system having a first passageway formed as a cylindrical bore for supplying both a welding wire to the tip of a welding torch nozzle and shielding gas to a gas diffuser, and a second passageway for introducing into the interior of the welding nozzle further gases which combine with the gases from the first passageway. The gas mixtures supplied via the first and second passageways have different compositions and mix within the interior of the gas nozzle to form a shielding gas mixture. The particular combination of passageways is designed for the purpose of introducing an oil mist within the welding nozzle to reduce the adhesion of weld spatter on the interior parts of the welding nozzle, but also reducing oil contamination of the welding wire passing via the first passageway.

The shielding gas system and welding tips described in both U.S. Pat. No. 4,567,343 and U.S. Pat. No. 5,844,201 appear complicated and would be costly to manufacture and/or replace.

The present invention seeks to mitigate or overcome one or more of the above-mentioned problems and/or seeks to provide an improved welding torch.

According to a first aspect of the present invention there is provided an arc welding torch including a welding wire guide that is open on one side at least in the region of the tip of the guide. In use, in respect of a region of the guide upstream of the tip, the wire is advantageously supported on one side by the guide (optionally on one side only). Preferably, the wire is unsupported on the opposite side, such that the opposite side of the wire is exposed. The majority of the circumference of the wire supported by the guide is advantageously exposed in respect of a section of the guide upstream of the tip. Thus, the surface that in use guides the wire is advantageously not a closed surface. (For the avoidance of doubt, the interior of a tube would in this context be in the form of a closed surface.) When viewed in cross-section the shape of the welding wire guide is advantageously able to fit within a notional sector defined by two radii meeting at a point on the welding wire and an arc joining the other ends of the radii, the angle between the radii being less than 300°. The cross-section of the guide may be so shaped for the majority (and preferably substantially all) of the length along which the wire is, in used, supported. Preferably, the angle between the radii is no greater than 270° and more preferably no greater than 225°. In some instances the angle between the radii may be no greater than 180°. In contrast, in the slot-like grooves of the prior art (for example, that illustrated in FIG. 2 of U.S. Pat. No. 4,988, 846) only a small proportion of the circumference of the wire is exposed, the welding wire guide fitting in a notional sector as defined above of greater than 300°.

In the welding torches of the invention, the wire is advantageously not directly prevented by parts of the guide from moving away from the guide in a range of directions perpendicular to the axis of the wire, the guide only directly restraining movement away in directions outside that range, and covering an angular range of more than 60° (possibly more than 90°, preferably more than 135° and possibly more than 180°). Thus, a wire guide that supports a wire on one side only, may fully restrain the wire from moving in a range of directions transverse to the axis of the wire and towards the guide whilst not preventing movement of the wire away from the guide in a range of directions including a range of directions perpendicular to the axis of the wire. In contrast, the deep slot-like grooves of wire guides of the prior art, which support the wire on more than one side only allow movement of the wire in one general direction transverse to the axis of the wire (out of the slot). The guide may be arranged to support the wire on one side and align the wire by restricting sideways movement, whilst leaving the majority of the circumference of the wire exposed. The guide is advantageously so shaped that in use welding wire in said region is supported on one side of the wire and unsupported on an opposite side of the wire. For example, the guide may include features such as a groove, an indent, or a discontinuity in a surface or between two surfaces, the feature being open on one side so that part of the supported side of the welding wire is recessed into the surface of the guide without the wire being totally enclosed. Said opposite side of the wire may be exposed in a region upstream of the tip of the guide.

The wire is advantageously aligned by means of a groove. The wire is preferably supported on one side without being substantially enclosed within the guide. For example, there may be provided an open groove being of relatively shallow depth compared to the diameter of the welding wire or having a shallow angle between the walls of the groove. Thus, a large proportion of the wire may be exposed when being aligned by the groove of the guide.

In one arrangement, a surface of the groove is in contact with the wire and the wire is partially contained within the groove and partially projects beyond the groove, thereby exposing part of the wire. Advantageously in this arrangement the depth of the groove is of the same order of magnitude as and preferably less than, the diameter of the wire. Thus, at least a part of the cross-section of the wire may project beyond the lip of the groove and is unsupported on that side. Preferably the groove is so shaped that no more than 60% of the circumference of the wire, and more preferably no more than 50% of the circumference of the wire, is contained within the groove (the proportion of the circumference of the wire that is supported being equal to or less than about half the wire circumference). In another arrangement the angle between the opposed walls of the groove of the guide is relatively shallow, for example, no less than approximately 90°, (0° corresponding to parallel walls). The groove angle (defined later with reference to the groove between workpieces to be welded together) may be greater than 60°, is preferably greater than 80° and more preferably greater than 100°. In such an arrangement the depth of the groove may be greater than the diameter of the wire, but the wire is arranged only to contact surfaces of the groove at points distributed over a relatively small segment of the cross section of the groove (for example the wire may only contact surfaces of the groove over a sector that extends for less than approximately ¼ of the circumference of the wire). Preferably, the guide includes a groove which is substantially "V"-shaped. A preferred feature common to certain of the above arrangements is that the groove does not enclose the wire, but the wire is substantially exposed, being supported on one side only by the guide surface.

Preferably, the electrode is open along its entire length and the wire is supported on one side only.

Advantageously, the torch is so arranged that in use welding current passes through at least part of the welding wire guide. A wire guide that is open on one side can still guide the welding wire and provide current to the wire, but has the great advantage of reducing wire-clogging problems that are observed when welding with a torch wherein the welding wire is guided within a cylindrical bore of a welding electrode. For example, the welding wire guide, being open on one side, may be much less vulnerable to problems associated with imperfections in the cross-sectional shape of the welding wire, or in the case of welding wire coated with copper, associated with burring of the copper coating caused, in use, by the wire feed mechanism of the welding torch, either of which can lead to wire-clogging problems. The geometry of the groove of the wire guide according to the invention can be effective in enabling contaminating material to fall away from the wire and the wire guide in a range of directions and alleviate problems associated with waste material collecting and becoming trapped in slot-like grooves or in cylindrical wire guides. Furthermore, they are less susceptible to sticking due to inconsistencies in the cross section of the wire as the wires are not confined to narrow slot-like grooves or bores. Also, it is thought that in prior art welding torches wherein the wire travels down the inside of a cylindrical bore or slot-like groove, deviations of the wire within the bore can cause variations in resistive heating within the welding electrode creating unstable conditions that can disrupt the control of the welding process.

The welding wire guide is preferably open along substantially the entire length of the portion of the guide that is arranged for guiding the welding wire. Such an arrangement may be provided by relatively simple geometries. The guide may thus advantageously not be provided with a central bore. The welding wire guide may however be provided with a longitudinally extending groove along which, in use, the welding wire is guided. Such a groove may assist in holding the wire in correct alignment with the guide.

The torch is preferably so arranged that, in use and during the passage of the welding wire towards the tip of the torch, the welding wire is caused to bend in a way that assists contact between the welding wire and the welding wire guide. The torch may be so arranged that, in use, the welding wire is fed to the welding wire guide from a laterally spaced-apart location. The wire and torch may be so arranged that the wire approaches the guide at an angle selected such that support of the wire by the guide downstream of the point of first contact between the wire and the guide is assisted by the inherent elasticity of the wire. If the angle is too shallow the wire may not be elastically deformed enough to maintain good contact downstream of the point of first contact, but if the angle of approach is too high, there may be plastic deformation of the wire resulting in loss of contact of the wire and the guide downstream of the point of first contact as the wire is fed along the guide.

The shape of the guide will of course affect the possible choices of angles of approach of the wire, as will the elasticity of the wire. A guide that is open on one side can, in use, facilitate the wire to approach the guide and be received into the required position on the guide from a laterally spaced-apart location. The welding guide may for example be straight downstream of the point of first contact. The welding guide may for example be curved downstream of the point of first contact, for example having a curvature such that the guide turns through an angle of less than about 30 degrees, and preferably less than 20 degrees, along its length. Such a gentle curvature causes the wire to elastically deform along the length of the guide and assists reliable contact between the wire and the guide. It will be understood that the curvature of the guide need not be constant and may for example have a smaller radius of curvature downstream. The welding wire guide may be substantially banana-shaped. In such a case, the wire may be kept on the guide due to the elasticity of the wire as it conforms to the shape of the guide.

The angle of approach of the wire may be between 5 and 45 degrees. The angle of approach of the wire may be greater than 15 degrees. The angle of approach of the wire may be greater than 20 degrees. The angle of approach of the wire may be less than 40 degrees. The angle of approach may be lower in the case where the guide has a curved shape to assist contact between the wire and the guide downstream. In a case wherein, in use, the welding wire is fed to the welding wire guide from a laterally spaced-apart location, and the welding wire includes a generally straight section upstream of, and close to, the point of first contact between the wire and the guide, the angle of approach of the wire may be defined as the angle between the straight section and the tangent of the line defined by the axis of the wire at a point immediately downstream of the point of first contact.

The elasticity of the wire can allow the guide to be open with the bending of the wire restraining the wire from moving away from the guide. Such a function need not therefore be provided by a particular profile of the guide, for example a closed or enclosed profile.

Preferably, in use, the wire is guided along, and is substantially parallel to, the guiding surface of the guide for at least 50% (preferably at least 90%, and more preferably substantially all) of the length of the guide downstream of the point of first contact. Preferably, in the case where the welding current is in use provided from the guide to the wire, by means of a portion of the wire guide defining a conductive surface, the wire is in contact with the guide along substantially the entire length of said portion of the guide.

The wire is preferably supported on the welding wire guide such that the wire is forward of the guide in the direction of travel. The welding wire guide may be inclined (and not perpendicular) relative to the welding line, for example, so that the tip of the welding wire guide trails behind an upstream portion of the guide in the welding torch travel direction. The end of the welding wire guide may be angled such that in use the angle between the wire axis at the end of the wire and the welding line (measured by rotating from the axis of the wire at the end of the wire towards the welding line ahead of the welding region) is between 70 and 110 degrees. In some cases it may be beneficial for the angle to be an acute angle, for example less than 85 degrees. In some cases the angle may be less than 75 degrees. With such an acute angle of inclination the welding wire can effectively be dragged along the welding line, which reduces the chance of the welding wire catching or jerking whilst being moved. Positioning the wire in front of the guide also assists in moving the wire along the welding line in a smooth and controlled manner. When using the torch of the invention during the laying of pipelines in a J-lay configuration, the angle at which the wire guide is inclined relative to the welding line may be relatively constant. When laying pipelines in an S-lay configuration, with the pipes being horizontal when being welded together, the angle of inclination may be varied during the welding process to support the weld pool against the pull of gravity.

The welding torch may be provided with a shielding gas system. Shielding gas systems of the prior art are typically coaxially arranged with the cylindrical bore down which the welding wire is fed. Thus, the shielding gas typically flows out of annularly shaped outlets and form a generally round footprint of shielding gas at the welding region. In relation to the present invention, the welding wire guide and welding wire need not be concentrically arranged and it has been found that geometries different from the conventionally concentrically arranged shielding gas systems are possible. For example, a laminar flow of shielding gas may be generated by means of two opposing flows merging at the region of the welding tip of the welding torch. The footprint of shielding gas formed may be elongate and aligned with the line of welding. Such an elongate footprint of gas may thus cover a length (along the welding line) per unit area (of the notional footprint of gas) greater than the length covered by the concentrically arranged gas systems of the prior art. Such extended coverage of the weld by shielding gas is particularly beneficial when welding together thicker workpieces, such as for example when welding together pipes having a wall thickness of greater than 30 mm, because with thicker workpieces the weld joint tends to be hotter (temperatures greater than about 70° Centigrade) for longer and therefore prone to oxidation for longer. Moreover, some of the new geometries of shielding gas systems that we have developed have been found to have utility independent of the design of the welding wire guide according to the first aspect of the invention. The shielding gas system is preferably so arranged that in use when the welding torch is operated to form a weld pool and is translated along a welding line the footprint of the shielding gas in the welding region is generally elongate, preferably generally oblong, the long axis of shape of the footprint being generally aligned with the welding line.

The torch may be configured for welding in and along a groove formed between two work-pieces as the torch is moved relative to and along the groove. Advantageously, at least a portion of the welding torch in the region of the welding tip is so shaped that its cross-sectional shape is elongate in a direction along the direction of relative movement along the groove. Providing a welding tip that is thicker in the welding direction, than in a direction transverse to the line of welding, allows the welding tip to be provided with a given welding current at a lower rate of resistive heating at the tip, as a result of the greater cross-sectional area of the welding tip. The welding tip may however still be used to weld in narrow grooves, because the width of the tip, in the direction across the groove, need not be increased. Such an arrangement is straightforward to facilitate and manufacture in the case where the welding tip of the torch is open on one side, as is the case in this first aspect of the invention. Also, as a result of the welding tip of the torch being open on one side, the cross-sectional shape of the tip can generally be readily manufactured so as to have a relatively large area compared to the tubular wire guide arrangements of the prior art.

According to a second aspect of the invention there is provided an arc welding torch for welding in a welding region, the torch including at least two distinct and separate shielding gas conduits for providing shielding gas to the welding region, wherein the conduits are arranged such that in use a shielding gas stream from one of the conduits combines with a shielding gas stream from another of the conduits to form a unitary gas stream that flows towards the welding region. The distinct and separate shielding gas conduits may be arranged to provide shielding gas to the welding region via gas outlets, the outlets being arranged such that in use the shielding gas streams from the conduits combine downstream of the outlets to form the unitary gas stream. Advantageously, there is provided in accordance with this second aspect an arc welding torch for welding in a welding region, the torch including a plurality of distinct and separate shielding gas conduits for providing shielding gas to the welding region, wherein the plurality of conduits comprises two conduits which are arranged such that the conduits are, in respect of at least the majority of (and preferably for at least 90% of) the lengths of the conduits, wholly positioned to either side of a notional plane and such that a shielding gas stream from one of the two conduits combines directly with a shielding gas stream from the other of the two conduits to form a unitary gas stream that flows towards the welding region.

The shielding gas conduits may be positioned such that the gas flows that combine to form the unitary gas stream meet in such a way that the direction of flow of one stream is not parallel with the direction of flow of another gas stream. Preferably, the direction of flow of one stream relative to another is less than 120° (i.e. 60°+60°), is preferably less than 100° and more preferably is less than 90°. The angle of inclination may be greater than 30° and is preferably greater than 60°. The shielding gas flowing through each conduit is preferably of substantially the same composition. For example, the shielding gas that in use flows down each conduit may conveniently be provided from a single source. The distinct and separate conduits may divide out from a single upstream conduit. The distinct and separate conduits may effectively merge at the point at which the separate shielding gas flows combine to form a single downstream conduit. The outlets of the distinct and separate shielding gas conduits may therefore be positioned upstream of a further outlet of such a single combined downstream conduit. The welding torch is advantageously arranged such that in use the separate shielding gas flows are substantially laminar in form immediately upstream of the region at which they merge. The welding torch is advantageously arranged such that in use shielding gas from each conduit merges to form a laminar flow. Preferably, the conduits of the gas shielding system are arranged such that the gas flowing from one conduit does not mix completely with gas from any other shielding gas conduit. When, in use, the shielding gas from the conduits combine, there may be limited mixing of the gases from respective conduits in the unitary gas stream, but it is preferred that the shielding gas conduits are arranged such that at least some of the gas in one conduit does not mix with gas from any other conduit at least for as long as the unitary gas stream is formed as a laminar flow.

It is believed that shielding gas arrangements according to this second aspect of the invention are able to provide stable laminar flows of shielding gas that extend for longer distances than otherwise equivalent shielding gas arrangements, in which separate gas streams do not so combine. The welding torch may be arranged such that in use a laminar flow of shielding gas extends for greater than 30 mm from the outlet or outlets from which the unitary gas stream exits. Preferably, the welding torch is arranged such that the distance from the outlet(s) at which in use a laminar flow of gas is able to be maintained is at least 20 mm. Preferably, the distance is greater than 40 mm. The distance may be about 60 mm or more.

Each shielding gas conduit preferably has a section that tapers in the downstream direction. Such a tapering shape may cause the gas flow through the conduit to accelerate. The tapering is preferably arranged such that in use the tapered section of the conduit acts as a venturi tube. The shielding gas conduit may at the end of the tapered section have a constricted portion.

The shielding gas system is advantageously so arranged that in use shielding gas exits from a conduit that flares in the downstream direction. For example, each shielding gas conduit may have a section immediately upstream of an outlet of the conduit, which section flares in the downstream direction. The shielding gas conduits may alternatively, or additionally, merge into one conduit that comprises a flared length of conduit. Such a flaring of the conduit, whilst possibly reducing slightly the speed of the gas flow, may aid stabilisation of the gas stream flowing out from the outlet (by reducing turbulent flows at the edges of the gas flow) and, despite such a possible speed reduction, enable the shielding gas flow to remain stable for a greater distance from the outlet. Preferably, each shielding gas conduit has a section that tapers in the downstream direction and a section downstream of the tapering section that flares in the downstream direction. It is believed that it is possible by means of providing one or more such flared portions to increase the range of the gas flow from about 20 mm to about 40 mm or potentially more (for example up to about 60 mm).

Each shielding gas conduit preferably has a shielding gas outlet that is generally elongate, and preferably oblong, in cross-sectional shape. The cross-section of the shielding gas conduit near the outlet thereof is preferably shaped such that in use it is longer in a direction parallel to the line of welding than its width in a direction perpendicular to the line of welding. Such a geometry may facilitate the advantageous elongate footprint of gas mentioned above.

The shielding gas conduits may be positioned such that in respect of a portion of one shielding gas conduit, the portion is spaced-apart from all other shielding gas conduits. Preferably, the shielding gas conduits are spaced apart from one another for the majority of, and more preferably substantially the entire length of, the conduits from the upstream location at which the separate conduits first start to the downstream location at which the separate gas flows combine.

Two of said at least two shielding gas conduits are preferably located such that in use at least portions of the two respective conduits are provided on opposite sides of the welding electrode of the welding torch and preferably such that in use they are located on opposite sides of the plane of welding. (The plane of welding may in respect of this feature be defined as the plane that, at a given instant, is co-planar with both the axis of the torch and the line of welding.) Advantageously, the outlets of the two conduits and the portions immediately upstream thereof are located on opposite sides of the welding plane. Preferably, the conduits are located such that during use they are located on opposite sides of the plane of welding for substantially their entire length. Such arrangements may facilitate the symmetrical merging of the separate gas streams, the plane of merging of the two gas streams being aligned with the axis of the welding torch, or preferably with the plane of welding. This may in turn improve the stability of the gas flow towards the welding region.

The welding torch preferably includes a cooling fluid conduit for providing cooling fluid to cool a part of the welding torch, wherein at least a part of the cooling fluid conduit is positioned between two of said at least two shielding gas conduits. As the two shielding gas conduits may, at least in part, be spaced-apart the geometry of the welding torch may facilitate the positioning of both shielding gas conduits and cooling fluid conduits close to the axis of the welding torch. The cooling fluid conduit may extend in a lengthwise direction (along the axis of the welding torch) to a region at or near, and possibly beyond, the outlets of the gas conduits. Cooling fluid may thus advantageously be provided close to the welding tip, which is a region of high heat generation. At least a part of the cooling fluid conduit is circumferentially positioned about the axis of the welding tip between two of said at least two shielding gas conduits. For example, when viewed in cross-section two shielding gas conduits may be positioned to the left and right, respectively, of a notional central axis, whereas one or more cooling fluid conduits may be positioned above and/or below.

There may of course be more than one cooling fluid conduit. There is for example conveniently provided a cooling fluid conduit for returning cooling fluid from the part of the welding torch being cooled.

As mentioned above, it is advantageous to have an elongate shielding gas footprint. Thus, there is further provided according to a third aspect of the present invention, an arc welding torch for welding in a welding region, the torch including a shielding gas system comprising at least one shielding gas conduit for providing shielding gas to the welding region, wherein the shielding gas system is so arranged that in use when the welding torch is operated to form a weld pool and is translated along a welding line the footprint of the shielding gas in the welding region is generally elongate, and preferably generally oblong, the long axis of the footprint being generally aligned with the welding line. The shielding gas system is preferably arranged so that the shielding gas emerging from at least one conduit surrounds a welding electrode in the welding region. The oblong footprint may be generally rectangular in cross-section. It will of course be appreciated that whilst the footprint may not have an exact or constant shape, the general shape of the footprint can be readily observed by experiment. The footprint of the shielding gas may be defined as the shape at a given distance along the gas flow (the distance for example being the distance to the work-piece) defined by the smallest notional area that covers 80% of the total volume per unit length of the shielding gas at that distance. Such a notional area can be defined by means of modelling the fluid flows. The oblong footprint may be generally oval in cross-section.

The shielding gas system may in accordance with this aspect of the invention comprise just one shielding gas conduit. Preferably, however there are at least two shielding gas conduits for providing shielding gas, via gas outlets, to the welding region. In such a case, each shielding gas conduit may have a shielding gas outlet that is generally elongate, for example oblong, in cross-sectional shape, the long axis of the elongate shape of each outlet being generally aligned with the welding line.

Advantageously, the welding torch is so arranged that in use the welding takes place preferably towards the front of the footprint of the shielding gas (in the direction of travel of the welding torch). Thus, for a given point of welding, during a single welding pass, the point is exposed to shielding gas for longer after welding than before welding. Thus for a given flow rate of shielding gas, the gas can provide more shielding against oxidation than when the welding is performed in the middle of the footprint of the shielding gas. Again, this feature, although put to particular advantage in the case wherein the footprint is elongate, may be of advantage in a case, wherein the footprint is differently shaped.

According to a fourth aspect of the invention there is provided an arc welding torch for welding in a welding region, the torch including a shielding gas system comprising at least one shielding gas conduit for providing shielding gas to the welding region, wherein the welding torch is so arranged that, during use when the welding torch is operated to form a weld pool and is translated along a welding line, the portion of the footprint of the shielding gas in the welding region that trails behind the weld pool is longer along the welding line than that of the portion of the footprint of the shielding gas in the welding region that leads in front of the weld pool, whereby for a given point of welding the point is exposed to shielding gas for longer after welding than before welding. The shielding gas system is preferably arranged so that the shielding gas emerging from at least one conduit surrounds a welding electrode in the welding region. Thus, when the torch moves along the line of welding, the welding is advantageously conducted at the front of the footprint such that the weld remains within the footprint of the gas for longer. The footprint is preferably elongate.

A fifth aspect of the present invention provides an arc welding torch including a welding tip for providing a welding current, wherein the torch is configured for welding in and along a groove formed between two work-pieces as the torch is moved relative to and along the groove, and at least a portion of the welding torch near the welding tip is so shaped that its cross-sectional shape is elongate in a direction along the direction of relative movement along the groove. Preferably, the cross-sectional area at the tip of the torch is smaller than the area at a position further from the tip. The position further from the tip may for example be a position remote from the tip, but at a part of the torch that is arranged for supporting and guiding the wire. Providing a welding tip that is thicker in the welding direction, than in a direction transverse to the line of welding, allows the welding tip to be provided with a given welding current at a lower rate of resistive heating at the tip, as a result of the greater cross-sectional area of the welding tip. The welding tip may however still be used to weld in narrow grooves, because the width of the tip, in the direction across the groove, need not be increased. Such an arrangement may be especially convenient when the welding tip supports the wire on one side only, or is open on one side. The welding wire guide may have a cross-section that varies along its length. For example, the cross-sectional area at the tip of the welding wire guide may be smaller than the area at a position further from the tip. Preferably, the depth of the welding tip (along the direction of welding) is greater at a position upstream of the welding tip than the depth at a region nearer the tip. Advantageously the depth of the cross-section tapers from the root to near the tip. It will of course be appreciated that the root is at the end opposite the tip of the torch, the root being at or next to where the electrode emerges from a housing of the welding torch for example. It will be appreciated that the welding tip may be in the form of a welding electrode. Providing a welding electrode that has a relatively small cross-sectional area at the tip can increase the manoeuvrability of the electrode and decrease the chances of shorting between the electrode and a work piece. It is particularly advantageous to have a small cross section at the tip when the electrode is used in grooves with a relatively narrow gap at the bottom of the groove (such as is typically the case with narrow angled grooves), enabling the tip to fit in the groove. Providing an electrode with a relatively large cross-sectional area at a position remote from the tip may assist in effectively dissipating heat from the electrode, may provide decreased electrical resistance and may have better mechanical strength than electrodes having a relatively small cross-sectional area at such a position. Preferably, the width of the welding wire guide (that is, the dimension both perpendicular to its length and to the direction of travel along the joint to be welded) is substantially constant for the majority of the length of the welding wire guide.

Preferably, the thickness of the welding wire guide (that is, the dimension perpendicular to its length and parallel to the direction of travel along the joint to be welded) progressively reduces for the majority of the length of the welding wire guide. Thus, whilst a portion of the welding torch near the welding tip is so shaped that its cross-sectional shape is elongate in a direction along the direction of relative movement along the groove, the cross-sectional shape at the tip need not be elongate. In this context, the term "near the tip" may be defined as covering any position in the region of the tip of the welding wire guide. Alternatively, the term "near the tip" may be defined as covering any position in the last third of the exposed length of the welding wire guide. Alternatively, the term "near the tip" may be defined as covering any position that may in use be inserted into a joint to be welded.

The portion of the welding torch that forms the welding tip is advantageously configured to guide welding wire. Also, the portion of the welding torch that is configured to guide the welding wire is preferably so shaped that in use welding wire is supported on one side of the wire and unsupported on an opposite side of the wire.

The present invention also provides a method of welding including a step of providing a welding torch according to any aspect of the invention described herein. The welding torch of some aspects of the invention is particularly suited to welding in narrow grooves and/or thick walled work-pieces. When welding thick walled pipes together it is desirable to weld efficiently and reliably in a groove that is both narrow and deep. The method of the invention may be used on pipes with thick walls, in which the groove is deep and narrow and the walls of the groove are inclined at a steep angle (the angle defined between the walls being relatively low). Such narrow grooves tend to need less weld material to fill each groove and thus welding of pipes may be effected faster. However, such a groove geometry requires a less intrusive torch and/or a less bulky torch head and also makes it difficult to flush out oxygen from the bottom of the groove. Torches of the present invention have however been found to be able to weld very reliably in such narrow and deep grooves. It will be appreciated that pipes having a wall thickness of greater than 30 mm may be considered as being thick-walled pipes. Thick-walled pipes typically have a wall thickness of about 35 mm for example.

There is provided, in relation to an especially preferred aspect of the method of the present invention, a method of welding two pipes together, the method comprising the steps of arranging two pipes end to end, the pipes being so shaped that a circumferentially extending groove is defined between the ends of the pipes, and welding in the groove with an arc welding torch according to any aspect of the invention described herein, wherein the groove has a cross-sectional shape such that the angle defined by two notional non-parallel straight lines that meet at the centre of the bottom of the throat of the groove and extend out of the groove, each line touching the curve that defines the wall of the groove both at the point of intersection of the lines and at least one other point, the lines never crossing said curve, is less than 30 degrees (defined herein as the "groove angle"). Such a groove may be described as a narrow groove. Preferably, the groove is shaped such that the groove angle is less than 25 degrees, and more preferably less than 20 degrees. It will be appreciated that the groove angle may be greater than 30 degrees, even where the walls defining the groove are parallel, because the groove may be shallow. Also, the afore-mentioned angle may still be less than 30 degrees, even though portions of the walls defining the groove may be positioned at an angle much greater than 30 degrees. Preferably, the walls defining the groove are parallel to each other for at least part of their height.

The method conveniently includes a step of providing shielding gas to the region in the groove being welded, the shielding gas being provided from one or more outlets. Preferably, the outlet closest to the welding region is, during performance of the method, separated from the bottom of the unwelded groove by at least 30 mm. The welding torch is advantageously so configured that the method can be performed such that the separation of the closest outlet from the bottom of the groove is at least 40 mm, and more preferably about 60 mm or more.

It will be appreciated that features described in relation to one aspect of the invention may where appropriate be incorporated into another aspect. Also, there are various features that may be incorporated into any of the aspects of the invention as will be clear from the description that now follows.

The welding torch may include a welding wire guide. The welding wire guide may be open on one side at least in the region of the tip of the guide. The guide may be so shaped that in use welding wire in said region is supported on one side of the wire. The guide may be so shaped that in use welding wire in said region is unsupported on one side of the wire, which may of course be on an opposite side of the wire to a side that is supported by the guide.

The welding wire guide of the welding torch is conveniently elongate in shape. Preferably, the welding wire guide has a length greater than 5 times the maximum dimension of the guide in a direction perpendicular to its length. The welding torch may include a welding tip for providing a welding current. At least a portion of the welding torch in the region of the welding tip is so shaped that its cross-sectional shape is elongate in a direction along the welding line.

The tip of the welding torch may be defined by a welding electrode, which may also perform the function of a welding wire guide. The tip of the welding torch may be removably mounted and is conveniently designed to be disposable. Features of the present invention enable for the lifetime of each welding tip to be significantly extended in comparison to disposable tips of the prior art. The torch of the present invention may be adapted for use with a removably mountable welding wire guide that in use provides welding current to welding wire. It will be appreciated that the welding torch according to certain embodiments of aspects of the present invention may be provided to the end-user without a welding tip.

The welding torch may be so configured to be able to be used in a method of welding such that the welding wire has, during use, a stick-out length of at least 10 mm. Preferably, the stick-out length is less than about 30 mm and more preferably less than 20 mm. Longer stick-out lengths might disrupt reliable control of the welding parameters. As such, the geometry of the welding torch of the present invention may be important if the torch is to be used to weld in narrow and deep grooves, especially grooves having a depth greater than 20 mm. The welding tip may therefore advantageously extend significantly beyond the shielding gas outlet closest to the welding tip. For example, the welding tip may extend more than 20 mm beyond, and preferably more than 30 mm beyond, the closest gas outlet. The welding tip may be curved or straight.

The current carrying portion of the welding wire guide may be insulated from at least a part of the exterior surface of the guide. The current carrying portion of the guide is preferably in electrical conductive communication with a part of the exterior surface of the wire supporting part of the guide in the region of the downstream end of the guide (the end that in use is nearest the welding region). The torch may be configured such that the current carrying portion of the guide is insulated from the exterior surface of the guide that in normal use would be able to contact a workpiece, apart from the exterior surface of the wire-supporting part of the guide that provides electrical conductive communication between the wire and the current-carrying portion of the guide. The insulation may be provided by for example a ceramic insulating coating on the exterior of the welding wire guide. Thus, accidental contact of certain portions of the welding wire guide with the workpiece should not cause short circuits; such short circuits if they do occur can cause significant disruptions to the on-going welding.

The torch may include a shielding gas system. The shielding gas system may include one or more, and optionally at least two, distinct and separate shielding gas conduits for providing shielding gas, via one or more gas outlets, to the welding region. Conduits may be arranged such that in use shielding gas from one conduit combines downstream of the outlets with shielding gas from another conduit to form a unitary gas stream that flows towards the welding region. The welding torch may be so arranged that the footprint of the shielding gas in the welding region is generally oblong in shape. The welding torch may be arranged for translation along a welding line. The oblong footprint may be generally aligned with the welding line. The welding torch may be so arranged that the portion of the footprint of the shielding gas in the welding region that trails behind the weld pool is longer along the welding line than that of the portion of the footprint of the shielding gas in the welding region that leads in front of the welding pool. The welding torch may be so arranged that for a given point of welding, the point is exposed to shielding gas for longer after welding than before welding.

Each shielding gas conduit may have only one outlet. Preferably there is a maximum of two shielding gas conduits running along the length of the torch.

The shielding gas used is conveniently an inert gas. The inert gas may be a combination of argon and/or carbon dioxide at concentrations dependent on the particular welding process used. The inert gas may be more dense than air.

The cooling fluid conduit and the shielding gas conduit may be arranged such that in respect of a cross-section of the torch, the cross-section being perpendicular to a notional central axis of the torch and in the region of the part of the torch that is in use cooled by the cooling fluid, the cooling fluid conduit is closer to the central axis than the shielding gas conduit. The notional central axis, if not otherwise readily discernable, may be defined as a central axis that is perpendicular to the line of welding and coplanar with the welding electrode at the region of welding. The cooling fluid may consequently be able to be provided closer to the welding tip. The cooling fluid conduit and the shielding gas conduit may be arranged such that in respect of any such cross-section that includes a section of both conduits, the cooling fluid conduit is closer to the central axis than the shielding gas conduit. As mentioned above two or more shielding gas conduits may be provided. The cooling fluid conduit may be positioned within an interior region at least partly defined by the shielding gas conduit(s). At least a part of the cooling fluid conduit may be positioned between two shielding gas conduits.

The welding torch may be adapted for gas metal arc welding (GMAW).

The present invention yet further provides a welding wire guide for use as the welding wire guide of a torch according to any of the aspects of the invention described herein.

The terms upstream and downstream are used herein in relation to positions relative to the welding wire guide or to the torch electrode of a welding torch. It will be understood that in this context the tip of the welding torch will usually be at a position at the downstream end of the torch and the source of the welding wire will generally be at a position upstream of the tip and that shielding gas, if such gas is provided, will flow from an upstream end of the torch towards the downstream end. The terms "upstream" and "downstream" may therefore be construed with reference to the movement of welding wire or the flow of shielding gas, depending on which construction is most appropriate.

By way of example embodiments of the invention will now be described with reference to the accompanying schematic drawings, of which:

FIG. 5 is a perspective view of the torch of the first embodiment;

FIG. 6 is a cross-sectional view from above of the torch of the first embodiment in use;

FIG. 7 is a side cross-sectional view taken along the line D-D of the torch of FIG. 6;

FIG. 8 is a cross-sectional view of a narrow groove;

Figure 1:
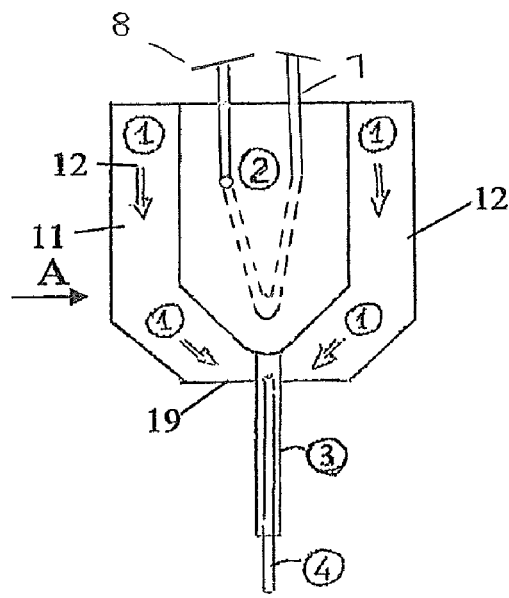
FIG. 1 is a cross-sectional view of a welding torch according to a first embodiment of the invention.
Figure 2:
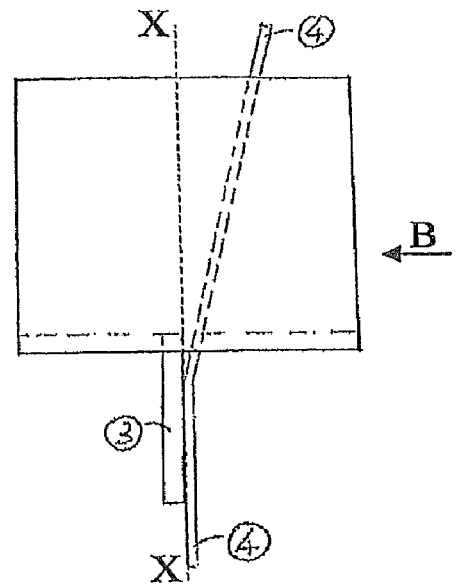
FIG. 2 is a view of the torch of FIG. 1 looking along arrow A.

FIGS. 1 to 7 illustrate a GMAW welding torch according to a first embodiment of the invention. The torch includes a main support body 2 from which there extends a thin and elongate removably mounted electrode 3 that guides, supports and supplies current to welding wire 4. As is shown most clearly in FIG. 5, the electrode has a longitudinal groove 9 formed therein which guides the welding wire 4 along the electrode 3. The electrode 3 is thus open along its entire length and the wire 4 is supported on one side only. The electrode 3 has a length of about 45 mm, a width (across the direction of welding) of about 2.5 mm and a depth (along the direction of welding) tapering from about 6 mm at the root of the electrode to about 2.5 mm at its tip. (The cross-section of the welding electrode is thus generally elongate in the direction of the welding, in that it is deeper than it is wide, for substantially its entire length.) The welding wire 4 is fed to the electrode 3 from a laterally spaced-apart location and the wire 4 approaches the electrode 3 at an angle of 27 degrees. The support of the wire 4 by the electrode 3 downstream of the point 10 of first contact between the wire 4 and the electrode 3 is assisted by the inherent elasticity of the wire. The welding wire of the first embodiment has a diameter of 1.14 mm and is formed of standard X65 steel. The typical stick-out length of the wire is about 10 mm. Furthermore, it will thus be appreciated that the cross-sectional area of the electrode at the tip of the torch is smaller than the area at a position further from the tip closer to the root, but also arranged for guiding the wire. It will also be appreciated that the illustrated welding electrode is deeper at a position upstream of the tip than at a position nearer the tip.

Figure 10:
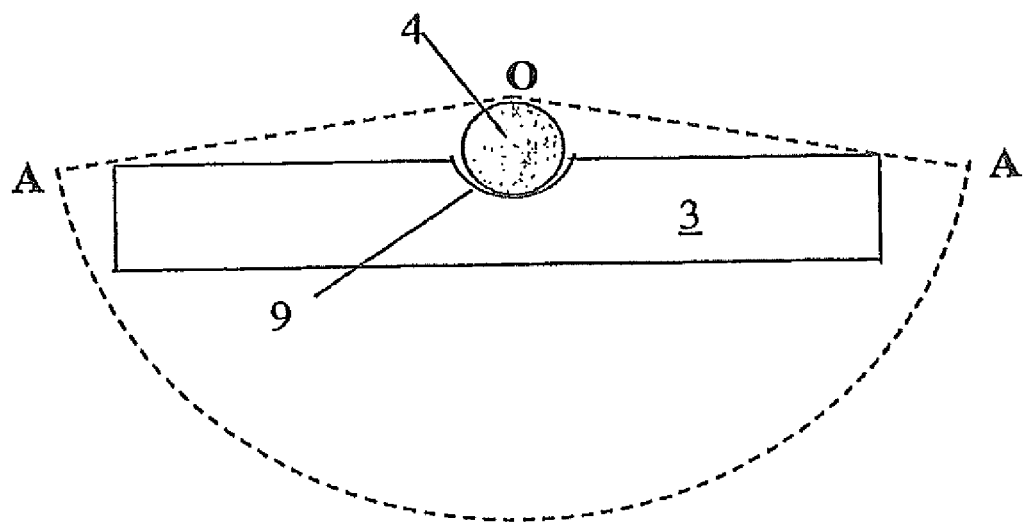
FIG. 10 is a cross-sectional view of a part of a wire guide of the welding torch of FIG. 5.

FIG. 10 shows a cross-section of the surface of the electrode 3 shown in FIG. 5, the cross-section being taken near the tip, in which the profile of the longitudinal groove 9 can be seen. The groove in FIG. 10 is a shallow groove having a generally "U"-shaped profile being open on the upper face as shown in FIG. 10. When aligned in the groove 9, the welding wire 4 projects out of the groove 9, the depth of which is less than the diameter of the wire 4. Approximately 40% of the circumference of the circular wire 4 is supported and contained within the groove 9 and the remainder of the wire 4 projects beyond the lip of the groove 9, the majority of the circumference of the wire being exposed. The wire 4 is only supported on the lower side as shown in FIG. 10, the upper side is unsupported where the wire guide is open. The guide aligns the wire on the electrode and restricts the wire from moving sideways. Broken lines O-A represent radii projecting from the wire that define a notional sector in which the wire guide fits. In FIG. 10 the angle between the radii defining the sector is less than 180° (the angle being about 160°). Thus the guide does not prevent movement of the wire in a range of directions perpendicular to the axis of the wire.

The torch includes an outer housing 11, which encompasses the support body 2 of the torch, the regions between the housing 11 and the body 2 thereby defining two distinct and separate shielding gas conduits 12, through which in use shielding gas flows (represented schematically by arrows 1). The two conduits 12 are thus positioned on opposite sides of the body 2 of the torch. A mixture of Argon and Carbon Dioxide (as is standard in the art) is, in use, fed into the gas conduits 12 via a single feed pipe (not shown) upstream of both conduits 12. At their downstream ends the conduits turn the gas flows so that the exiting gas flows are directed towards each other, the angle of separation of the directions of flow being about 80° (i.e. 40°+40°). The conduits 12 merge downstream such that the shielding gas 1 from the left-hand conduit (with reference to FIG. 1) combines with the shielding gas 1 from the right-hand conduit to form a unitary gas stream (not shown). The unitary stream flows out through a single outlet 19 (about 5 mm downstream of the point at which the two shielding gas conduits 12 merge. The conduits and the common outlet 19 are each generally rectangular in cross-section. The unitary gas stream formed is in the form of a generally laminar flow, which extends for at least 50 mm beyond the common outlet 19, having a generally oblong cross-section. The welding electrode 3 extends about 40 mm from the common outlet 19 (the root and the first 5 mm of the length of the electrode 3 being accommodated within the body of the torch) and, as mentioned above the wire stick-out length is about 10 mm. Therefore the laminar flow extends all the way up to the end of the wire 4. At a certain distance from the common outlet, the laminar flow tends to be more prone to flow separation. However, the shielding gas flow is able to reach a distance of about 10 mm beyond the wire and be effective at a distance of up to at least 60 mm from the common outlet 19. During welding, the welding torch is thus ideally positioned so as to be no further away from the bottom of the joint to be welded than about 60 mm.

Although not shown clearly in FIG. 1, each shielding gas conduit 12 includes a tapered portion that results in a constriction along the conduit 12. This constricted section accelerates the shielding gas flowing through the conduit in a manner similar to a venturi tube. Immediately before the common outlet 19, the conduits 12 flare (best seen in FIG. 5) outwardly so as to reduce turbulence at the periphery of the gas flow.

Figure 3:
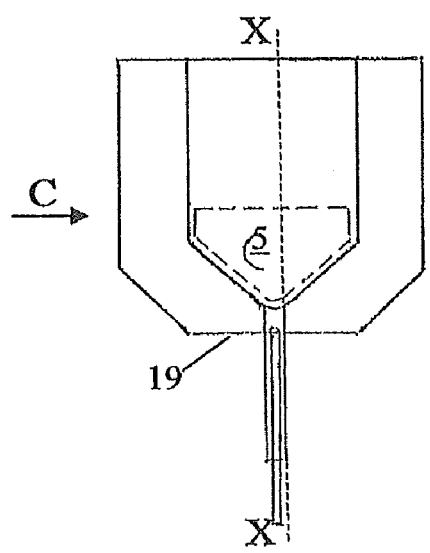
FIG. 3 is a view of the torch of FIG. 2 looking along arrow B.
Figure 4:
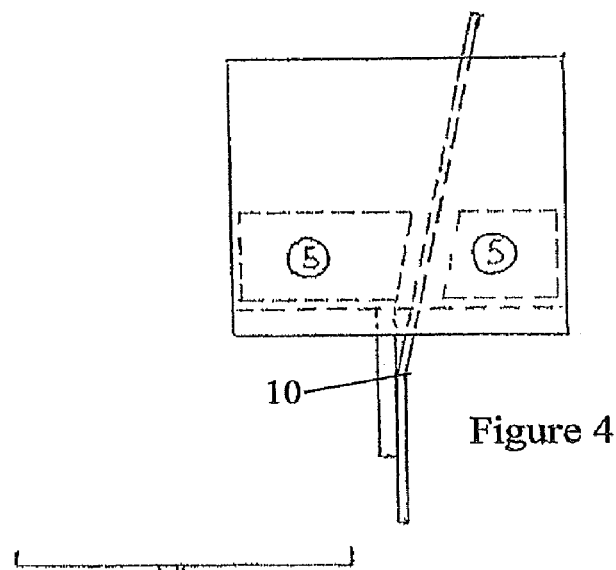
FIG. 4 is a view of the torch of FIG. 3 looking along arrow C.

The body 2 of the torch contains cooled regions 5 which are in use supplied with cooling fluid (in the form of water) supplied by a cooling fluid supply conduit 7 and removed by cooling fluid removal conduit 8. The removed cooling fluid flows to a heat exchange unit (not shown) for cooling. The cooled cooling fluid is then recirculated to the torch by means of the supply conduit 7. As can be seen in FIGS. 3 and 4, the regions 5 cooled by the cooling fluid are close to the welding electrode 3 and to the axis X-X (see FIGS. 2 and 3) of the torch. The cooling fluid conduits 7, 8 extend into and out of the cooled regions 5 and thus parts of the cooling fluid conduits 7, 8 are positioned between the two shielding gas conduits 12.

FIGS. 6 and 7 show the welding torch in use, when forming a weld 13 in a longitudinal groove 14 formed between two work-pieces 15, 16, arranged one on top of the other, the electrode of the welding torch being generally horizontal for the entire length of the weld. FIG. 6 is a cross-sectional plan view of the torch taken along a plane that is aligned with and bisects the welding line and FIG. 7 is a transverse cross-sectional view illustrating the weld when viewed from the side, the cross-section being taken along the line D-D of FIG. 6. The torch is in use moved along a welding line, which is defined by the length of the groove 14, in the direction shown by arrow 17, the wire 4 being positioned in front of the electrode 3. As can be seen in FIG. 6, the electrode 3 is dragged over the groove 14 at an angle of about 70 degrees between the length of the electrode and the welding line ahead (in the direction 17 of travel of the torch). The shielding gas forms a generally rectangular footprint 18 at the region of the welding and the end of the wire 4 (a portion in the middle of the wire, not the end, being shown in the cross-section of FIG. 7) is positioned towards the front (in the direction 17 of travel) of the footprint 18 of the shielding gas. As can be seen in FIG. 7, the long axis of the footprint 18 is aligned with the line of the groove 14. During welding the portion of the footprint 18 of the shielding gas in the welding region that trails behind the wire 4 is significantly longer along than that of the portion of the footprint 18 that leads in front of the wire 4. Thus, for a given point along the groove 14, the point is exposed to shielding gas for longer after welding than before welding, and the shielding gas is used more efficiently.

As will be appreciated from the illustrations of the first embodiment, including FIGS. 1 and 7, the shielding gas surrounds the electrode and wire, the wire and the shielding gas emerging from a common outlet in the torch housing. Thus a shielding gas footprint is produced that envelops the electrode and the wire. Such an arrangement provides improved shielding of the wire and the electrode over the length of the wire from when it emerges from the housing of the torch to the weld pool and therefore provides a greater degree of shielding than arrangements in which the shielding gas is released from outlets on either side of the electrode and wire or upstream and/or downstream of the wire.

The torch of the first embodiment is particularly suitable for welding in narrow grooves. Such a narrow groove is shown in FIG. 8. Thus, a groove 14 is formed between two work-pieces 15, 16 to be joined. The walls of the groove 14 are steep, and are substantially parallel for most of their height. The groove is several times deeper than it is wide. Moreover the groove has a cross-sectional shape such that the angle defined by two notional non-parallel straight lines (the dashed lines in FIG. 8) that meet at the centre of the bottom of the throat of the groove and extend out of the groove, each line touching the curve that defines the wall of the groove both at the point of intersection of the lines and at least one other point, the lines never crossing said curve, is about 20 degrees.

Figure 9:
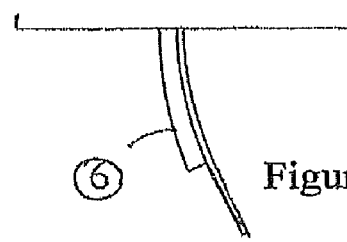
FIG. 9 is a view of a part of a welding torch according to a second embodiment of the invention.

FIG. 9 is a view of an electrode 6 of a welding torch according to a second embodiment of the invention. The electrode 6 is generally banana-shaped and the electrode 6 has a curvature such that it turns through an angle of about 12 degrees. Such a curvature assists reliable contact between the wire and the guide as a result of causing the wire to elastically deform along the length of the electrode 6.

Figure 11:
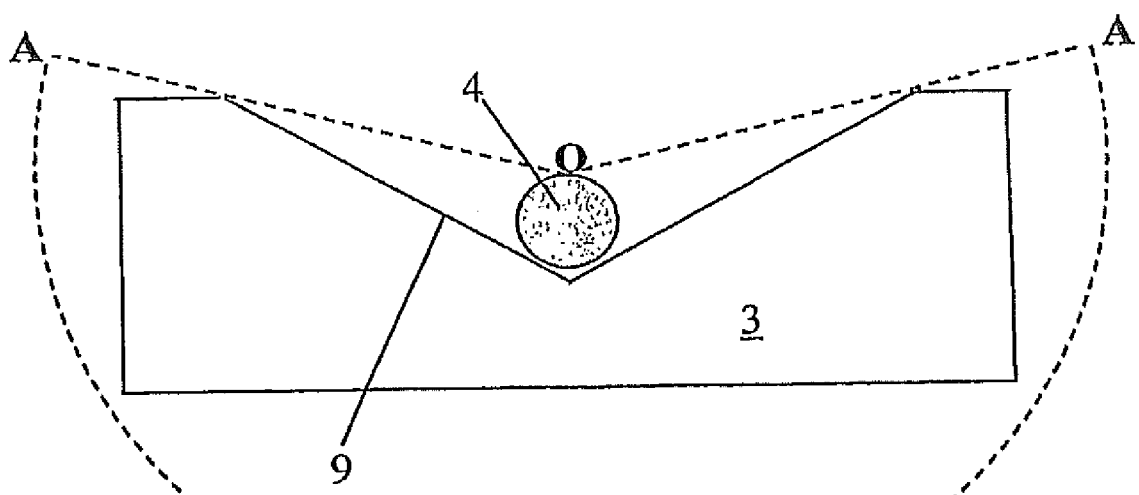
FIG. 11 is a cross-sectional view of a part of a wire guide of the welding torch according to an alternative arrangement of the first aspect of the invention to that shown in FIG. 10.

FIG. 11 shows an alternative groove profile to that shown in FIGS. 5 and 10, but otherwise the welding torch is identical to that shown in FIG. 5. The groove 9 in FIG. 11 is similarly open on one side being of a generally "V"-shaped cross-section with a shallow angle (that is one greater than 90°) between the walls of the groove 9. Only a small segment of wire 4 is adjacent to or in contact with the surface of the guide. The cross-section of the wire is supported by the guide at two points on the wire separated by about 90° of the circumference of the wire. The majority of the circumference of the wire 4 is not in close proximity to a wall of the guide and is exposed. Thus, when aligned in the groove 9 shown in FIG. 11, the welding wire 4 is exposed only being supported on one side. Broken lines O-A represent radii projecting from the wire that define a notional sector in which the wire guide fits. In FIG. 11 the angle between the radii defining the sector is approximately 210° (i.e. less that 270°). Thus the guide does not prevent movement of the wire in a range of directions perpendicular to the axis of the wire.

Figure 12:
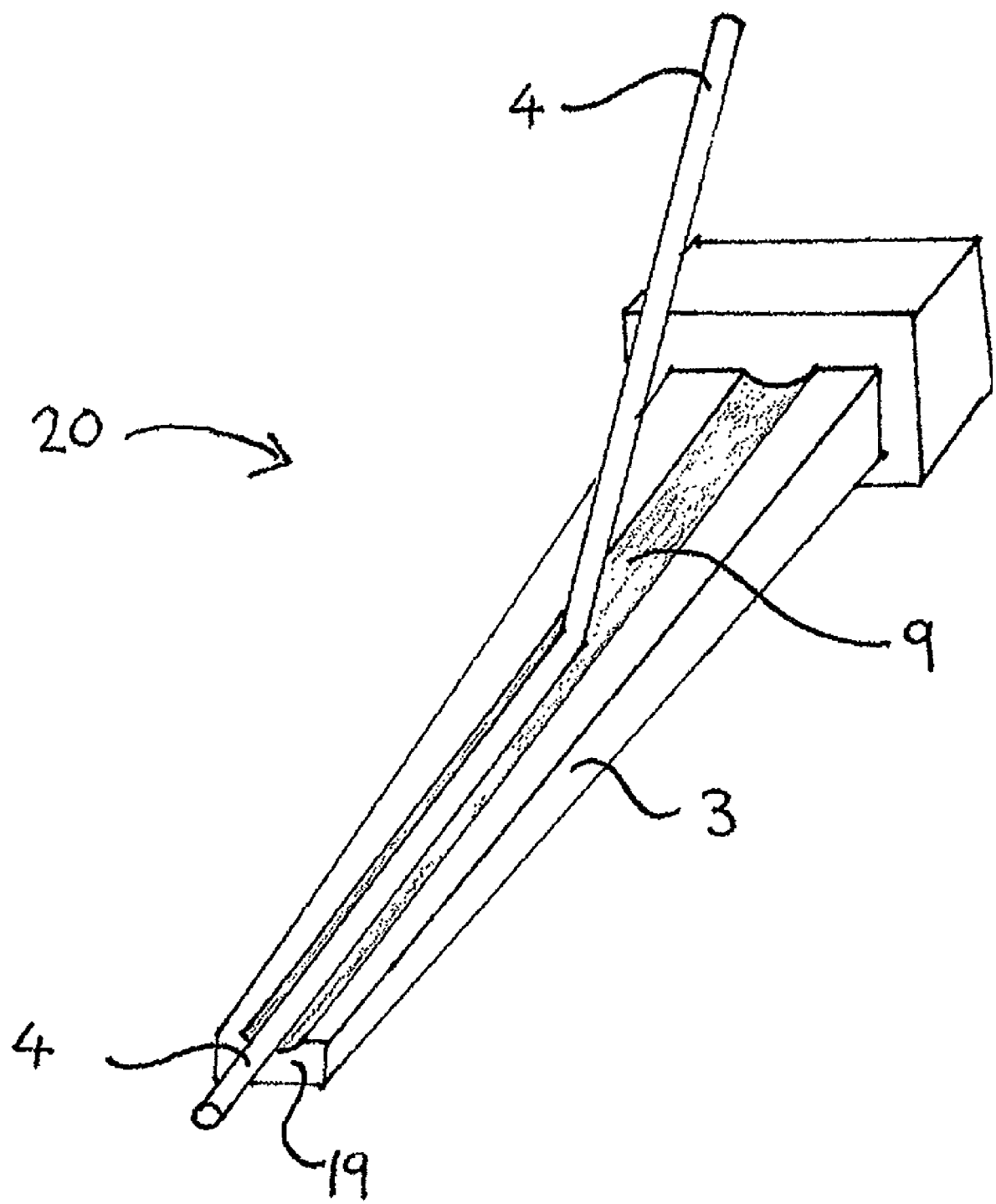
FIG. 12 is a view of a removable welding wire guide for an arc welding torch.

FIG. 12 shows a removable mountable welding wire guide 20 for an arc welding torch including a tip 19. The removable mountable welding wire guide 20 is open on one side in the region of the tip 19 so that in respect of a region upstream of the tip 19, a welding wire 4 is supported on one side by the removable mountable welding wire guide 20 in a groove 9 and unsupported on an opposite side to that which is supported, such that the opposite side of the wire 4 is exposed. The removable mountable welding wire guide 20 includes an element to enable the removable mountable welding wide guide 20 to be mounted on an arc welding torch so that the welding wire 4 may be fed to the removable mountable welding wire guide 20 from a laterally spaced-apart location.

It will be appreciated that various modifications may be made to the above-described embodiments without departing from the spirit of the invention. For example, the separate gas conduits may terminate at separate and distinct outlets, rather than merging and terminating in a single common outlet. The gas streams may be arranged to merge at an angle other than 80°, and may for example be arranged to merge at a shallower angle such as 60°. The housing that defines the outer walls of the respective conduits could extend further along the length of the electrode thus causing the outlet of the shielding gas to be nearer the end of the electrode. Such an arrangement might limit the depth of narrow grooves in which the torch is able to weld (owing to the resulting conduit obstructing or otherwise interfering with the work-pieces to be welded and vice-versa), but would improve the extent of laminar and reliable shielding gas flow beyond the tip of the electrode. The electrode may be coated with a ceramic insulating layer up to a region at the tip of the electrode where electrical contact between the wire and electrode is required to allow welding current to flow from the electrode to the wire. It is envisaged that the embodiment described above could be adapted for different lengths of welding tips. For example, welding tips having lengths of 25 mm and 35 mm are envisaged.

The invention claimed is:

1. An arc welding torch comprising:
a welding wire guide for guiding a welding wire, the welding wire guide including a tip and being open on one side at least in a region of the tip, wherein said welding wire guide is arranged so that, in respect of a region upstream of the tip of the welding wire guide, the welding wire is supported on one side by the welding wire guide and unsupported on an opposite side, such that the opposite side of the welding wire to the side that is supported is exposed, and the arc welding torch defines a location from which the welding wire is fed to the welding wire guide, the arc welding, torch being so arranged that said location is laterally spaced-apart from the welding wire guide.

2. An arc welding torch according to claim 1, wherein the arc welding torch is so arranged that welding current passes through at least part of the welding wire guide.

3. An arc welding torch according to claim 1, wherein the welding wire guide includes a portion that is arranged for guiding the welding wire and the welding wire guide is open along substantially an entire length of a portion of the welding wire guide that is arranged for guiding the welding wire.

4. An arc welding torch according to claim 1, wherein the welding wire guide has a longitudinally extending groove for guiding the welding wire.

5. An arc welding torch according to claim 1, wherein the welding wire first contacts the welding wire guide at a point of first contact, and wherein the arc welding torch is so arranged that the welding wire approaches the welding wire guide at an angle such that support of the welding wire by the welding wire guide downstream of the point of first contact between the welding wire and the welding wire guide is assisted by an inherent elasticity of the wire.

6. An arc welding torch according to claim 1, wherein the welding wire first contacts the welding wire guide at a point of first contact, and wherein the arc welding torch is so arranged that, the welding wire includes a substantially straight section upstream of the point of first contact between the welding wire and the welding wire guide, the angle between the straight section and a tangent of a line defined by an axis of the welding wire at a point immediately downstream of the point of first contact being between 5 and 45 degrees.

7. An arc welding torch according to claim 1, wherein
the tip of the wire guide is a welding tip for providing a welding current,
the arc welding torch is configured for welding in and along a groove formed between two work-pieces as the arc welding torch is moved relative to and along the groove, and
at least a portion of the arc welding torch in the region of the welding tip is shaped so that the arc welding torch has a cross-sectional shape that is elongate in a direction along the direction of relative movement along the groove.

8. An arc welding torch according to claim 1, wherein a shape of the welding wire guide, when viewed in cross-section, is able to fit within a sector defined by two radii meeting at a point on the welding wire and an arc joining the other ends of the radii, the angle between the radii being less than 300°.

9. An arc welding torch according to claim 1, wherein the welding wire guide provides welding current to the welding wire and is removably mounted on the arc welding torch.

10. An arc welding torch according to claim 1, wherein the welding wire guide provides welding current to the welding wire and the welding wire guide is elongate and has a length greater than 5 times a maximum dimension of the welding wire guide in a direction perpendicular to the length of the welding wire guide.

11. An arc welding torch according to claim 1, further comprising:
a shielding gas conduit for providing shielding gas to a welding region, the shielding gas conduit terminating at least one gas outlet, wherein the welding wire guide extends beyond the outlet by more than 10 mm,
wherein the welding wire guide provides welding current to welding wire.

12. An arc welding torch according to claim 1, further comprising:
a shielding gas system comprising at least one shielding gas conduit for providing shielding gas to a welding region; and
a cooling fluid conduit for providing cooling fluid to cool a part of the arc welding torch, the arc welding torch has a central axis, and
the cooling fluid conduit and the shielding gas conduit are so arranged that in respect of a cross-section of the torch, the cross-section being perpendicular to the central axis and positioned in a region of the part of the torch that is cooled by the cooling fluid, the cooling fluid conduit is closer to the central axis than the shielding gas conduit.

13. An arc welding torch according to claim 1, wherein the arc welding torch is adapted for gas metal arc welding.

14. A method of welding two pipes together, the method comprising:
arranging two pipes end to end, the two pipes being so shaped that a circumferentially extending groove is defined between the ends of the two pipes; and
welding in the circumferentially extending groove with an arc welding torch, including
a welding wire guide, for guiding a welding wire, the welding wire guide including a tip and being open on one side at least in a region of the tip, wherein said welding wire guide is arranged so that, in respect of a region upstream of the tip of the welding wire guide, the welding wire is supported on one side by the welding wire guide and unsupported on an opposite side, such that the opposite side of the welding wire to the side that is supported is exposed, and the arc welding torch defines a location from which the welding wire is fed to the welding wire guide, the arc welding torch being so arranged that said location is laterally spaced-apart from the welding wire guide, wherein
the circumferentially extending groove has a cross-sectional shape such that the angle defined by two non-parallel straight lines that meet at a centre of a bottom of a throat of the groove and extend out of the groove, each line touching a curve that defines a wall of the groove both at a point of intersection of the lines and at least one other point, the lines never crossing said curve, is less than 30 degrees.

15. A method according to claim 14, the method further comprising:
providing shielding gas to the region in the circumferentially extending groove being welded, the shielding gas being provided from one or more outlets, the closest of which to the welding region being separated from the bottom of the unwelded groove by at least 30 mm.

16. A method according to claim 14, wherein the method includes welding with welding wire that has a stick-out length of at least 10 mm.

17. A welding wire guide for an arc welding torch comprising:
a tip, the welding wire guide being open on one side at least in a region of the tip, wherein the welding wire guide is arranged so that in respect of a region upstream of the tip, a welding wire is supported on one side by the guide and unsupported on an opposite side to that which is supported, such that the opposite side of the wire is exposed and the welding wire guide is arranged and configured to be mountable on an arc welding a torch so that the welding wire may be fed to the welding wire guide from a laterally spaced-apart location.

18. A method of welding using a welding wire guide for guiding a welding wire, the welding wire guide including a tip, and being open on one side at least in a region of the tip, the method comprising:
feeding the welding wire to the welding wire guide from a location on the arc welding torch that is laterally spaced-apart from the welding wire guide,
supporting one side of the welding wire fed to the welding wire guide with the welding wire guide in a region upstream of the tip of the welding wire guide, an opposite side of the wire to that which is supported being unsupported and exposed;
and forming a weld with the welding wire.

* * * * *